(12) United States Patent
Sanderovich et al.

(10) Patent No.: US 9,936,352 B2
(45) Date of Patent: Apr. 3, 2018

(54) TECHNIQUES FOR ESTIMATING DISTANCE BETWEEN WIRELESS COMMUNICATION DEVICES

(71) Applicant: QUALCOMM Incorporated, San Diego, CA (US)

(72) Inventors: Amichai Sanderovich, Atlit (IL); Reuven Alpert, Caesarea (IL)

(73) Assignee: QUALCOMM, Incorporated, San Diego, CA (US)

( * ) Notice: Subject to any disclaimer, the term of this patent is extended or adjusted under 35 U.S.C. 154(b) by 136 days.

(21) Appl. No.: 14/612,270

(22) Filed: Feb. 2, 2015

(65) Prior Publication Data
US 2016/0227368 A1 Aug. 4, 2016

(51) Int. Cl.
*H04W 24/00* (2009.01)
*H04W 4/02* (2018.01)
*H04W 64/00* (2009.01)
*G01S 11/04* (2006.01)
*G01S 11/06* (2006.01)

(52) U.S. Cl.
CPC .............. *H04W 4/023* (2013.01); *G01S 11/04* (2013.01); *G01S 11/06* (2013.01); *H04W 64/00* (2013.01)

(58) Field of Classification Search
CPC ............................ H04W 4/023; H04W 64/00
USPC ........... 455/456.2, 63.1, 456.1, 67.13, 67.16, 455/562.1
See application file for complete search history.

(56) References Cited

U.S. PATENT DOCUMENTS

| | | | |
|---|---|---|---|
| 3,939,476 A | 2/1976 | Leopard et al. | |
| 7,248,841 B2* | 7/2007 | Agee .................... | H04B 7/0417 455/101 |
| 7,349,667 B2* | 3/2008 | Magee ................ | H04L 27/2647 455/63.4 |
| 7,965,761 B2* | 6/2011 | Shattil .................. | H04B 1/7174 375/147 |
| 8,095,097 B1* | 1/2012 | Nabar .................. | H04L 25/0204 370/338 |
| 8,170,081 B2* | 5/2012 | Forenza ............... | H04B 7/0417 370/278 |
| 8,385,455 B2* | 2/2013 | Fujimoto ............... | H04B 7/086 375/259 |
| 8,654,815 B1* | 2/2014 | Forenza ............... | H04B 7/0626 375/141 |

(Continued)

FOREIGN PATENT DOCUMENTS

WO WO-2013084030 A1 6/2013

OTHER PUBLICATIONS

International Search Report and Written Opinion—PCT/US2016/012841—ISA/EPO—Apr. 22, 2016.

*Primary Examiner* — Marceau Milord
(74) *Attorney, Agent, or Firm* — Patterson & Sheridan, LLP

(57) ABSTRACT

Certain aspects of the present disclosure relate to techniques and apparatus for estimating a distance between a first and second apparatus. For example, the first apparatus may obtain a plurality of training signals received in a plurality of directions from a second apparatus and estimate, based on the plurality of training signals, a distance between the first apparatus and the second apparatus. In certain aspects, the distance may be estimated based on a ratio of receive powers of first and second training signals of the plurality of training signals.

32 Claims, 11 Drawing Sheets

(56) References Cited

U.S. PATENT DOCUMENTS

| | | | | |
|---|---|---|---|---|
| 8,670,390 B2* | 3/2014 | Shattil | ............ | H04B 7/026 370/315 |
| 8,842,640 B2* | 9/2014 | Jeon | ............ | H04B 7/0413 370/328 |
| 8,942,082 B2* | 1/2015 | Shattil | ............ | H04B 7/026 370/208 |
| 8,982,803 B1* | 3/2015 | Zhang | ............ | H04B 7/0619 370/329 |
| 9,270,421 B2* | 2/2016 | Shattil | ............ | H04B 7/026 |
| 9,485,063 B2* | 11/2016 | Shattil | ............ | H04B 7/026 |
| 2002/0002066 A1 | 1/2002 | Pallonen | | |
| 2007/0197229 A1* | 8/2007 | Kalliola | ............ | G01S 3/46 455/456.1 |
| 2008/0100502 A1* | 5/2008 | Jantunen | ............ | G01S 3/74 342/146 |
| 2008/0204322 A1* | 8/2008 | Oswald | ............ | G01S 5/04 342/465 |
| 2011/0280188 A1* | 11/2011 | Jeon | ............ | H04B 7/0413 370/328 |
| 2013/0028246 A1 | 1/2013 | Gonikberg | | |
| 2013/0064315 A1* | 3/2013 | Heath, Jr. | ............ | C23C 14/04 375/260 |
| 2014/0004877 A1* | 1/2014 | Van Diggelen | ............ | G01S 5/12 455/456.1 |
| 2014/0044043 A1* | 2/2014 | Moshfeghi | ............ | H04W 84/00 370/328 |
| 2014/0307821 A1* | 10/2014 | Zhang | ............ | H04L 25/03904 375/267 |
| 2014/0334473 A1* | 11/2014 | Zhang | ............ | H04B 7/0617 370/338 |
| 2015/0126194 A1* | 5/2015 | Monteiro da Silva | ............ | H04B 7/0617 455/436 |
| 2015/0189619 A1* | 7/2015 | Kalliola | ............ | G01S 1/02 455/456.1 |
| 2015/0270882 A1* | 9/2015 | Shattil | ............ | H04B 1/0003 370/329 |
| 2015/0303950 A1* | 10/2015 | Shattil | ............ | H04B 1/0003 370/328 |
| 2016/0149302 A1* | 5/2016 | Sanderovich | ............ | H01Q 3/24 343/703 |
| 2017/0195893 A1* | 7/2017 | Lee | ............ | H04W 16/28 |

* cited by examiner

Assuming TX and RX are an equal distance from the wall, distance (d) may be obtained using the following equation:

$$\frac{L1}{L2} = \frac{L3}{L2} = \frac{d}{2 \times \sqrt{\left(\frac{d}{2}\right)^2 + r^2}}$$

Or by knowing angle theta, distance (d) may be calculated by using the following equation:

$$\theta = \arctan\left(\frac{2r}{d}\right)$$

TECHNIQUES FOR ESTIMATING DISTANCE BETWEEN WIRELESS COMMUNICATION DEVICES

TECHNICAL FIELD

The invention relates generally to millimeter wave radio frequency (RF) systems and, more particularly, to estimating a distance between a first and second apparatus using training signals.

BACKGROUND

The 60 GHz band is an unlicensed band which features a large amount of bandwidth and a large worldwide overlap. The large bandwidth means that a very high volume of information can be transmitted wirelessly. As a result, multiple applications, each requiring transmission of large amounts of data, can be developed to allow wireless communication around the 60 GHz band. Examples for such applications include, but are not limited to, game controllers, mobile interactive devices, wireless high definition TV (HDTV), wireless docking stations, wireless Gigabit Ethernet, and many others.

In order to facilitate such applications there is a need to develop integrated circuits (ICs) such as amplifiers, mixers, radio frequency (RF) analog circuits, and active antennas that operate in the 60 GHz frequency range. An RF system typically comprises active and passive modules. The active modules (e.g., a phased array antenna) require control and power signals for their operation, which are not required by passive modules (e.g., filters). The various modules are fabricated and packaged as radio frequency integrated circuits (RFICs) that can be assembled on a printed circuit board (PCB). The size of the RFIC package may range from several to a few hundred square millimeters.

In the consumer electronics market, the design of electronic devices, and thus the design of RF modules integrated therein, should meet the constraints of minimum cost, size, power consumption, and weight. The design of the RF modules should also take into consideration the current assembled configuration of electronic devices, and particularly handheld devices, such as laptop and tablet computers, in order to enable efficient transmission and reception of millimeter wave signals. Furthermore, the design of the RF module should account for minimal power loss of receive and transmit RF signals and for maximum radio coverage.

Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, etc, resulting in higher free space loss. The higher free space loss can be compensated for by using many small antennas, for example arranged in a phased array.

SUMMARY

Certain aspects of the present disclosure provide a first apparatus for wireless communications. The first apparatus generally includes an interface for obtaining a plurality of training signals received in a plurality of directions from a second apparatus. The first apparatus may also include a processing system configured to estimate, based on the plurality of training signals, a distance between the first apparatus and the second apparatus.

Certain aspects of the present disclosure provide a first apparatus for wireless communications. The first apparatus generally includes a first interface for outputting, for transmission, a plurality of training signals in a plurality of directions to a second apparatus, a second interface for obtaining, from the second apparatus, parameters corresponding to the training signals as received at the second apparatus, and a processing system configured to estimate, based on the parameters, a distance between the first apparatus and the second apparatus.

Certain aspects of the present disclosure provide a method for wireless communication by a first apparatus. The method generally includes obtaining a plurality of training signals received in a plurality of directions from a second apparatus, and estimating, based on the plurality of training signals, a distance between the first apparatus and the second apparatus.

Certain aspects of the present disclosure provide a method for wireless communication by a first apparatus. The method generally includes outputting, for transmission, a plurality of training signals in a plurality of directions to a second apparatus, obtaining, from the second apparatus, parameters corresponding to the training signals as received at the second apparatus, and estimating, based on the parameters, a distance between the first apparatus and the second apparatus.

Certain aspects of the present disclosure provide a first apparatus for wireless communication. The first apparatus generally includes means for obtaining a plurality of training signals received in a plurality of directions from a second apparatus, and means for estimating, based on the plurality of training signals, a distance between the first apparatus and the second apparatus.

Certain aspects of the present disclosure provide a first apparatus for wireless communication. The first apparatus generally includes means for outputting, for transmission, a plurality of training signals in a plurality of directions to a second apparatus, means for obtaining, from the second apparatus, parameters corresponding to the training signals as received at the second apparatus, and means for estimating, based on the parameters, a distance between the first apparatus and the second apparatus.

Certain aspects of the present disclosure provide a computer-readable medium for wireless communication having instructions stored thereon for causing a first apparatus to obtain a plurality of training signals received in a plurality of directions from a second apparatus, and estimate, based on the plurality of training signals, a distance between the first apparatus and the second apparatus.

Certain aspects of the present disclosure provide a computer-readable medium for wireless communication having instructions stored thereon for causing a first apparatus to output, for transmission, a plurality of training signals in a plurality of directions to a second apparatus, obtain, from the second apparatus, parameters corresponding to the training signals as received at the second apparatus, and estimate, based on the parameters, a distance between the first apparatus and the second apparatus.

Certain aspects of the present disclosure provide a wireless station. The wireless station generally includes at least one receive antenna, a receiver for receiving, via the at least one receive antenna, a plurality of training signals received in a plurality of directions from a second apparatus, and a processing system configured to estimate, based on the plurality of training signals, a distance between the first apparatus and the second apparatus.

Certain aspects of the present disclosure provide a wireless station. The wireless station generally includes at least one receive antenna, a receiver for receiving, via the at least one receive antenna, a plurality of training signals received in a plurality of directions from a second apparatus, and a processing system configured to estimate, based on the plurality of training signals, a distance between the first apparatus and the second apparatus.

DETAILED DESCRIPTION

Figure 1:
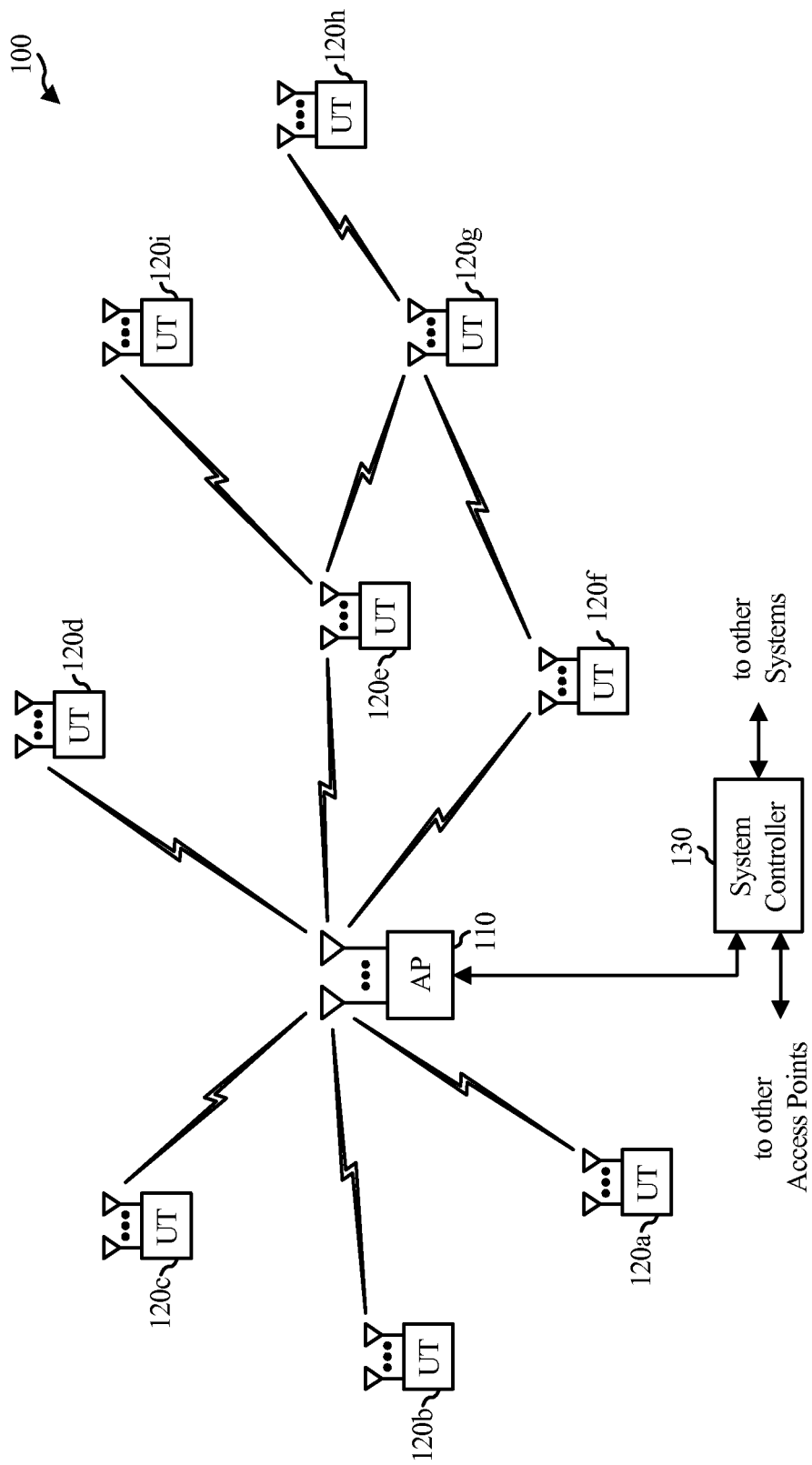
FIG. 1 illustrates a diagram of an example wireless communications network, in accordance with certain aspects of the present disclosure.

Aspects of the present disclosure provide techniques for estimating a distance between a first apparatus and a second apparatus based on training signals. The training signals may be transmitted by the second apparatus in a plurality of directions using different antenna configurations. The first apparatus may receive at least one of the training signals transmitted by the second apparatus and estimate a distance to the second apparatus using the at least one received training signal.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals in which aspects of the present disclosure may be practiced.

For example, access point 110 or user terminals 120 may determine relative rotation of devices utilizing techniques described herein. In some cases user terminals may be game controllers or the like and the techniques may be applied to determine relative rotation of the game controllers to a game station (acting as an access point).

For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$).) The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
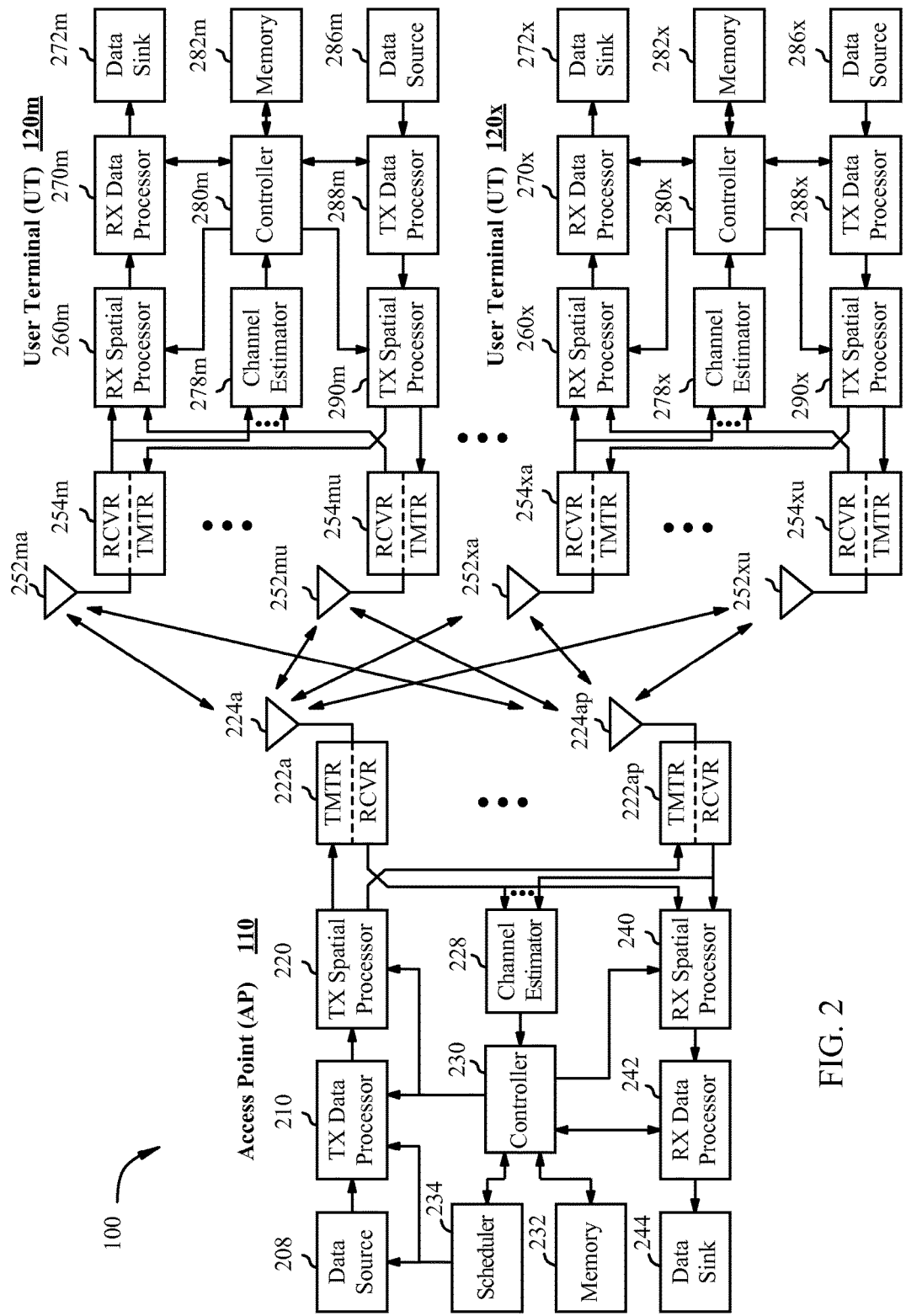
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100 in which aspects of the present disclosure may be practiced. As discussed above, the rotation determination techniques discussed herein may be practiced by an access point 110 or user terminal 120.

The access point 110 is equipped with $N_t$ antennas 224a through 224t. User terminal 120m is equipped with $N^{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N^{ut,m}$ transmit symbol streams for the antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N^{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N^{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

According to certain aspects of the present disclosure, the various processors shown in FIG. 2 may direct the operation at an AP 110 and/or user terminal 120, respectively, to perform various techniques described herein, to determine relative rotation based on training signals and/or other processes for the techniques described herein.

Figure 3:
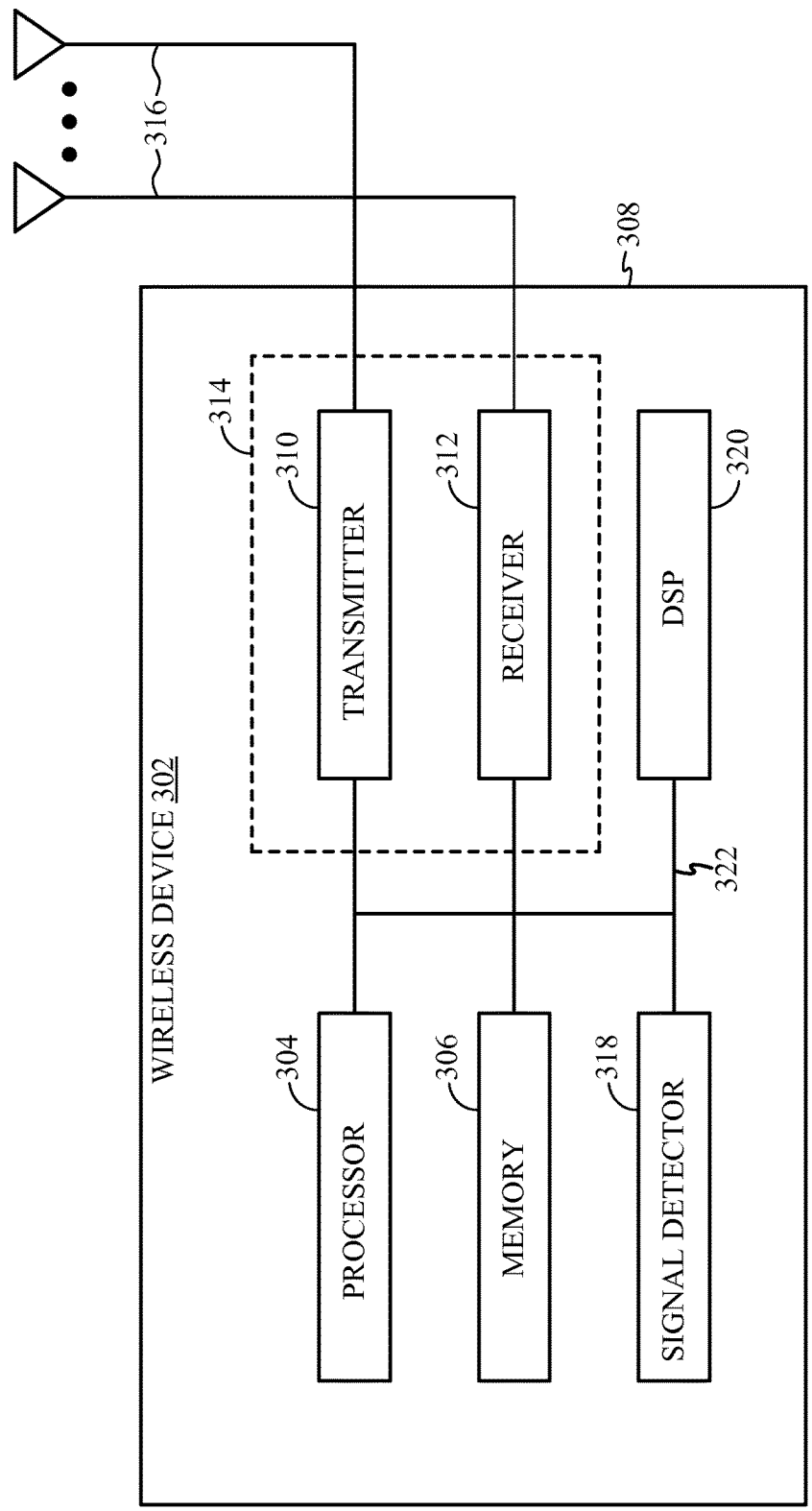
FIG. 3 illustrates a block diagram of an example wireless device, in accordance with certain aspects of the present disclosure.

FIG. 3 illustrates various components that may be utilized in a wireless device 302 in which aspects of the present disclosure may be practiced and that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein. Processor 304 may, for example, perform or direct operations 600 in FIG. 6 to determine relative rotation and/or other processes for the techniques described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Estimating Distance Using Training Signals

As noted above, aspects of the present disclosure are generally directed to estimating a distance between a first apparatus and a second apparatus using training signals transmitted and received between two devices. In some cases, the training signals may be exchanged during a beamforming (BF) training process, thus, additional overhead for exchanging the signals may not be necessary.

In any case, the estimation of distance between two apparatuses may be useful in applications such as access point association or queue-control (e.g., an access point may prioritize associating with stations in queue based on their relative distance), calibration of devices, and various optimizations of transmissions between devices.

Various techniques may be used to estimate the distance between devices. For example, one technique may estimate a distance between a receiver and a transmitter based on a signal level measured at the receiver. More specifically, this technique relies on the path-loss of the signal which may be proportional to the transmitter-receiver distance squared. However, results obtained using this approach may suffer due to high sensitivity to changes in the gain of the transmitter and receiver due to, for example, temperature changes or transmit power control induced changes. As a result, it may be difficult to calibrate the wireless system to determine a distance based on the power of a received signal using this technique.

In addition, the transmit power of the signal may also be used at the receiver to determine this distance. However, the receiver may not know the transmit power unless, for example, the receiver and transmitter stations are from the same vendor or if different vendors have agreed on a standard for communicating the transmit power. However, not all vendors may support this feature or may not maintain an exact transmit power because maintaining an exact transmit power may involve constant calibration.

Another technique involves measuring time-of-flight between the transmitter and receiver. However, this technique may involve tight cooperation between the transmitter and receiver. For example, highly calibrated transmit and receive chains may be used in order for the transmitter and receiver device to know the delay within each element of the receive and transmit chain (to determine when a transmission was sent relative to a timestamp sent with the transmission). In addition, distance between devices may be estimated using AP connected to both devices. However, this approach requires cooperation between the access points.

Therefore, what is needed are techniques for determining a distance between transmitter and receiver stations that address some of the aforementioned drawbacks. For example, it is desirable that such techniques require a relatively small amount of calibration and cooperation between devices.

Certain aspects of the present disclosure use training signals (e.g., during a BF training process) transmitted and received, for example, by phased array antennas to determine a distance between a first and second apparatus. A phased array antenna comprises multiple antennas that together are able to direct a signal in a particular direction. This may be accomplished by varying the antenna configuration or the relative phase of signals transmitted by each antenna in the array of antennas such that the signal is radiated in a particular direction. In certain aspects, the antennas may be millimeter wave phased array antennas. Millimeter wave signals are highly directional and thus, lend themselves to beamforming.

Figure 4:
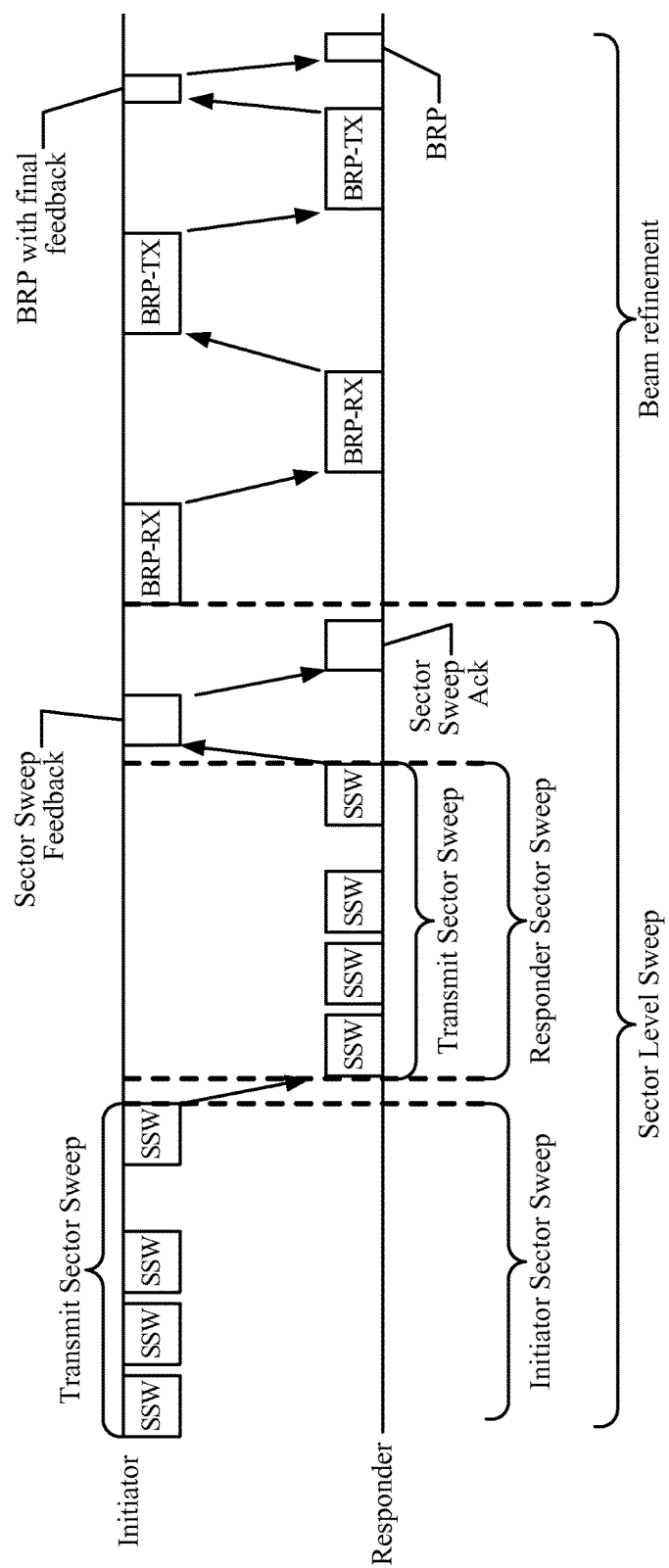
FIG. 4 is an example call flow illustrating a beam training phase, in accordance with certain aspects of the present disclosure.

In some cases, the training signals may be transmitted as part of a beamforming (BF) training process according to, for example, the IEEE 802.11ad standard. An example BF training process is illustrated in FIG. 4. The BF process is typically employed by a pair of stations, e.g., a receiver and transmitter. Each pairing of the stations achieves the necessary link budget for subsequent communication among those network devices. As such, BF training is a bidirectional sequence of BF training frame transmissions that uses sector sweep and provides the necessary signals to allow each station to determine appropriate antenna system settings for both transmission and reception. After the successful completion of BF training, a communication link is established.

As shown in FIG. 2, a large number of antennas may be place at each transceiver to exploit the beamforming gain for extending communication range. That is, the same signal is sent from each antenna in an array, but at slightly different times.

As shown in the example BF training process in FIG. 4, the BF process may include a sector level sweep (SLS) phase and a beam refinement stage. In the SLS phase, one of the STAs acts as an initiator by conducting an initiator sector sweep, which is followed by a transmit sector sweep by the responding station (where the responding station conducts a responder sector sweep). A sector is either a transmit antenna pattern or a receive antenna pattern corresponding to a sector ID. A station may be a transceiver that includes one or more active antennas in an antenna array (e.g., a phased antenna array).

The SLS phase typically concludes after an initiating station receives sector sweep feedback and sends a sector acknowledgement (ACK), thereby establishing BF. Each transceiver of the initiator station and of the responding station is configured for conducting a receiver sector sweep (RXSS) reception of sector sweep (SSW) frames via different sectors, in which a sweep is performed between consecutive receptions and a transmission of multiple sector sweeps (SSW) (TXSS) or directional Multi-gigabit (DMG) beacon frames via different sectors, in which a sweep is performed between consecutive transmissions.

During the beam refinement phase, each station can sweep a sequence of transmissions, separated by a short beamforming interframe space (SBIFS) interval, in which the antenna configuration at the transmitter or receiver can be changed between transmissions. In other words, beam refinement is a process where a station can improve its antenna configuration (or antenna weight vector) both for transmission and reception. That is, each antenna includes an antenna weight vector (AWV), which further includes a vector of weights describing the excitation (amplitude and phase) for each element of an antenna array.

Figure 5:
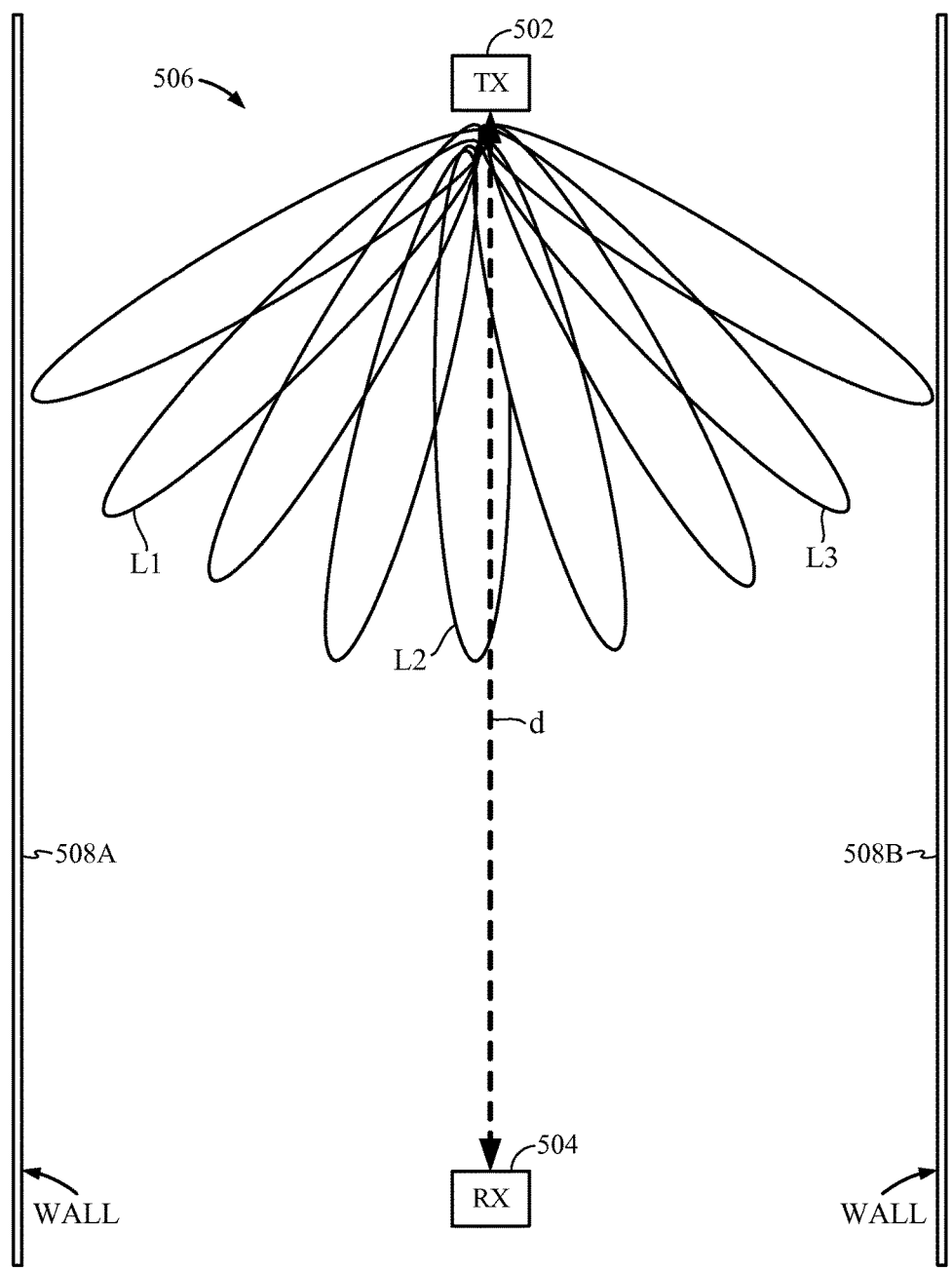
FIG. 5 illustrates sector level sweep during beamforming operations, in accordance with certain aspects of the present disclosure.

FIG. 5 illustrates a transmitting (TX) station 502 transmitting training signals (e.g., training signals 506) in various directions. These training signals may be used to estimate a distance d between the TX station 502 and a receiving (RX) station 504. As noted above, in some cases, the training signals 506 may be transmitted as part of a training procedure to help optimize communications between the two devices.

For example, by changing directions of transmitted signals, the TX station 502 may improve the signal to noise ratio and minimize interference in order to communicate with the RX station 504. During this training phase, the TX station 502 and RX station 504 may receive and transmit to and from several directions within a very short time period. Therefore temperature, transmit power and gain may be constant for each training signal, while a beam pattern of the transmitted signal changes in order to converge to the best direction.

In addition, each training signal may be separated from an adjacent training signal, direction-wise, by a certain angle. For example adjacent training signals may be separated by 10°. The training signals may be received by a RX station 504. As presented above, the SLS phase typically concludes after an initiating station TX 502 receives sector sweep feedback from the RX station 504 and sends a sector acknowledgement (ACK), thereby establishing BF. For example, the feedback from the RX station 504 may indicate which of the signals transmitted by the TX station 502 was received with the highest receive power, which may help indicate a direction corresponding to a line of sight (LOS) between the devices. In the illustrated example, signal L2 may be indicated as being received by the RX station 504 with the highest receive power among the plurality of training signals 506. The direction in which L2 was transmitted may then be used in subsequent communications between the TX station 502 and RX station 504. As illustrated, the training signals 506 may reflect off of obstructions (e.g., in a signal path of training signals 506) such as walls 508A and 508B, as will be discussed in more detail below.

Techniques described herein use the training signals, such as those that may be transmitted and received by TX and RX stations 502, 504 during the BF process to determine a distance between the TX and RX stations. For example, the distance between the devices may be determined based on parameters of training signals measured by the RX station 504, as will be discussed below.

Figure 6:
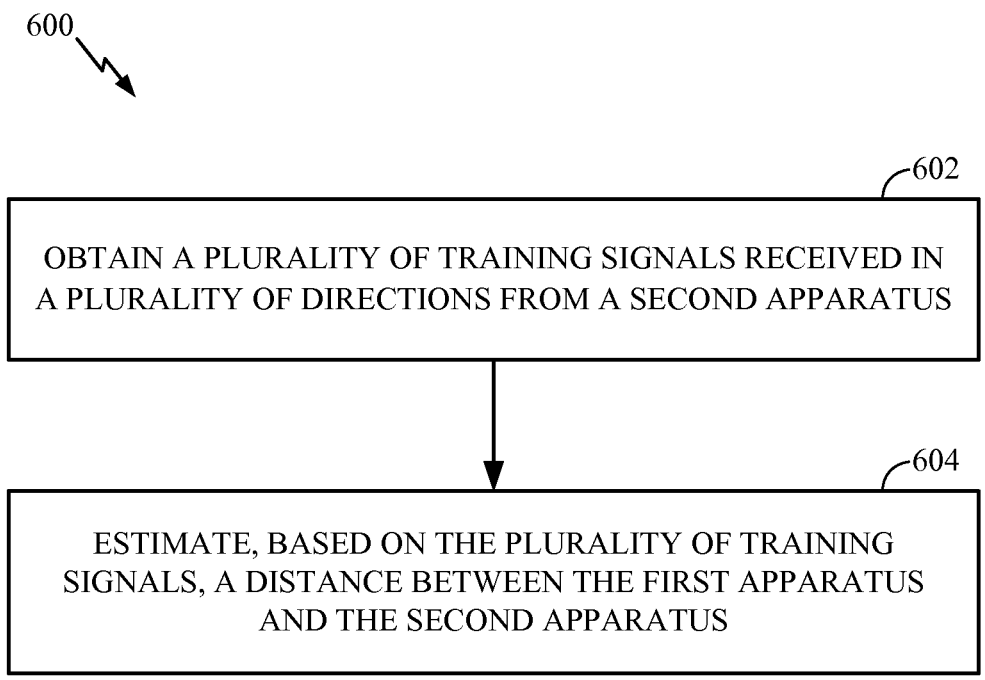
FIG. 6 illustrates example operations that may be performed by a wireless device for determining a distance to another device, in accordance with certain aspects of the present disclosure.

FIG. 6 illustrates example operations 600 for estimating a distance between a first apparatus (e.g., TX station 502) and second apparatus (e.g., RX station 504), in accordance with aspects of the present disclosure. The operations 600 may be performed, for example, by a first apparatus such as the RX station 504.

The operations 600 begin, at 602, by obtaining a plurality of training signals received in a plurality of directions from a second apparatus (e.g., TX station 502). For example, the RX station 504 may receive training signals 506 of FIG. 5, which may include training signals L1, L2 and L3. At 604, the RX station 504 may estimate, based on the plurality of training signals, a distance between the first apparatus and the second apparatus.

Several techniques may be used to estimate the distance between the first apparatus and the second apparatus based on the training signals. In a geometric-based technique, distance between devices may be estimated based on knowledge of the direction of training signals when they depart the TX station and the path these training signals travel to reach the RX station 504.

For example, an RX station 504 may estimate the distance between the TX station 502 and RX station 504 based on receive powers of at least first and second training signals selected from the training signals 506. For example, as described above with respect to FIG. 5, an RX station 504 may determine which of the training signals 506 was received from the TX station 502 with the highest receive power. That is, signal L2 may have the highest receive power as measured by the RX station 504 among the plurality of training signals 506, which may be indicative of a line of sight (LOS) direction between the devices. The RX station 504 may also select one or more other training signals to use in the distance estimation, for example, training signals L1 and/or L3 that are transmitted from TX station 502 at a direction with a known angular offset from L2.

Figure 7:
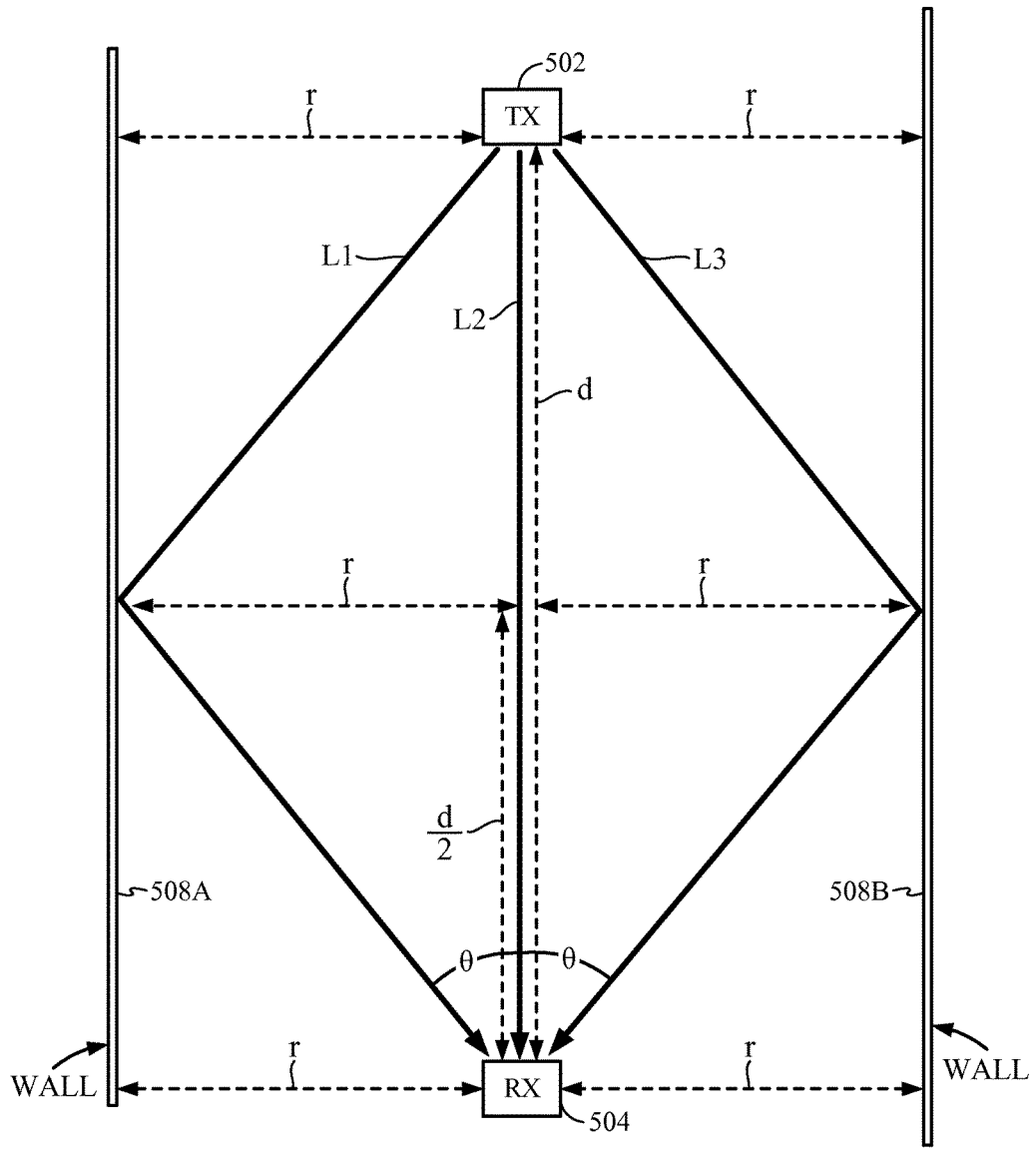
FIG. 7 illustrates example signal propagation and reflection during beamforming operations, in accordance with certain aspects of the present disclosure.

Using knowledge of certain features of the environment, the RX station 504 may estimate the distance d based on characteristics of the training signals L2, L1 and/or L3. For example, as illustrated in FIG. 7, an RX station 504 and a TX station 502 may be a certain distance r away from an obstruction such as a wall 508A. In this scenario, certain training signals (e.g., signals L1 of training signals 506) may reflect off the wall 508A. Therefore, signal L1 may be directed towards the RX station 504 due to its reflection off the wall 508A.

Upon receiving the signal L1, the RX station 504 may apply geometrical/trigonometric principles to estimate the distance d based on the distance r and the angle at which the reflected signal L1 was received relative to signal L2 (having the highest receive power). For example, distance d may be estimated in accordance with the following equation:

$$\theta = \arctan\left(\frac{2r}{d}\right)$$

where $\theta$ is the separation angle between L1 and L2, r is the distance from the RX station 504 or TX station 502 to the wall 508A, and d is the distance between the TX station 502 and RX station 504. The angle $\theta$ and distance r may be estimated or known by the TX station 502 or the RX station 504.

This simplified example is based on certain assumptions, such that the RX station 504 is a certain distance r from a first obstruction 508A and an equal distance r from a second obstruction 508B, as illustrated in FIG. 7. In this scenario, the RX station 504 may determine a training signal (e.g., signal L1) having a receive power that is approximately equal to the receive power of another training signal (e.g., signal L3). Therefore, the ratio of the receive power of L1 versus the receive power of L2 (having the highest receive power) may be equal to the ratio of the receive power of L3 versus the receiver power of L2. That is, L1 and L3 may be selected by the RX station based on the following criteria:

$$\frac{L1}{L2} = \frac{L3}{L2}$$

where L1 is the receive power of signal L1, L2 is the receive power of signal L2, and L3 is the receive power of signal L3. By selecting L1 and L3 based on this criterion, L1 and L3 may reflect off the walls 508 at a location that is approximately half the distance between the TX station 502 and RX station 504. Therefore, as illustrated in FIG. 7, the distance d from the TX station 502 and RX station 504 may be estimated per the following equation:

$$\frac{L1}{L2} = \frac{L3}{L2} = \frac{d}{2 \times \sqrt{\left(\frac{d}{2}\right)^2 + r^2}}$$

where r is the distance from the RX station 504 or TX station 502 to the wall 508, and d is the distance between the TX station 502 and RX station 504. In certain aspects, the RX station 504 may select the signals L1 and L3 such that both signals L1 and L3 are offset from signal L2 by an equal angle of separation. For example, as illustrated, the angle of separation between L1 and L2 may be equal to the angle of separation between L2 and L3.

While the example illustrated in FIG. 7 is based on certain assumptions to facilitate understanding, those skilled in the art will appreciate that with additional processing, those assumptions may be relaxed. For example, it may not be necessary that the device be equidistance from each wall, as with additional processing the receiving device may be able to determine the direction of a beam, even if there is no corresponding beam traveling a similar path (as is the case with L1 and L3 in FIG. 7). With additional processing, relatively accurate distance estimations may be obtained in more complex geometric scenarios.

According to certain aspects of the present disclosure, estimating the distance between the first and second apparatuses may be based on differences in measured receive power for one or more pairs of the training signals (e.g., receive power of L1 and L2). For example, differences in measured receive power for the one or more pairs of training signals may be compared to differences in previously measured receive power for the one or more pairs of training signals obtained at known distances.

Figure 8:
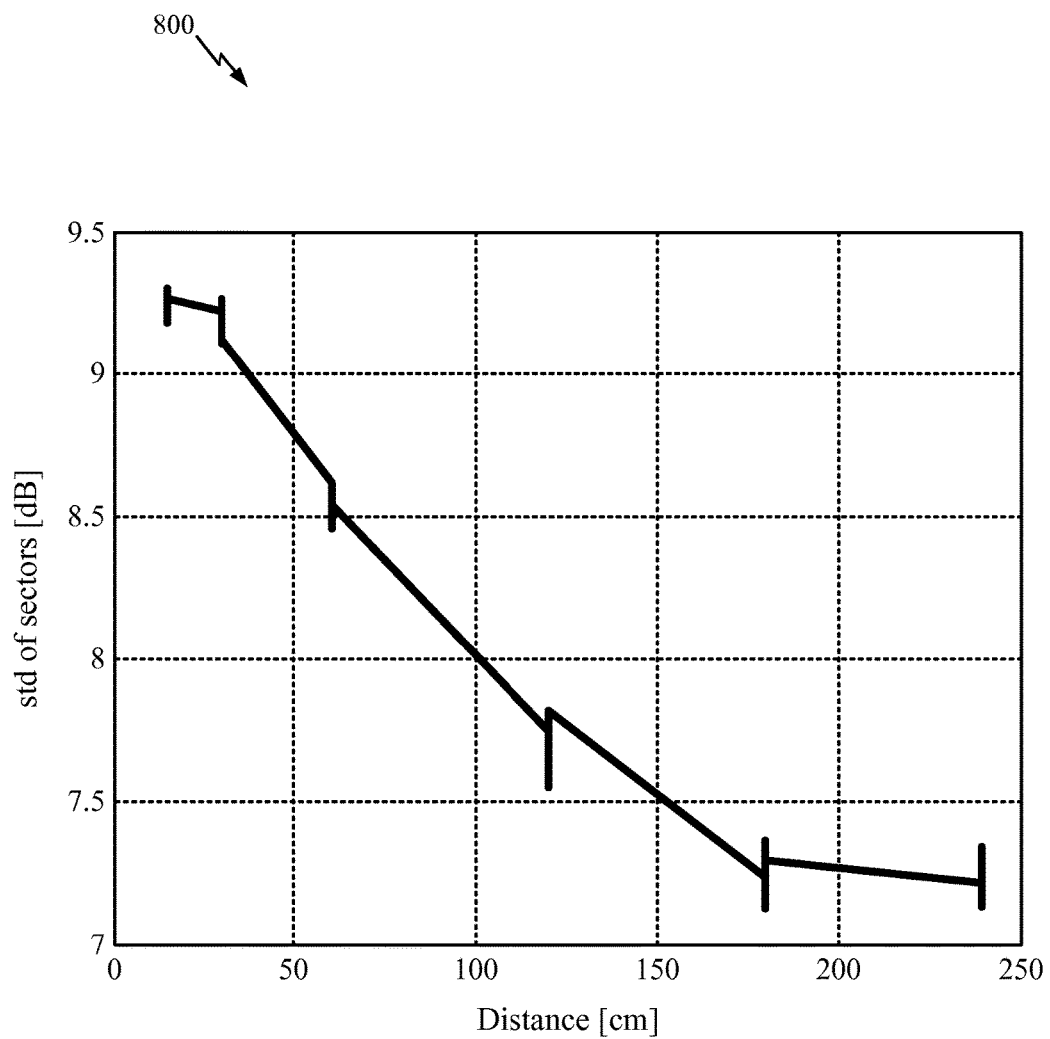
FIG. 8 is a graph of a standard deviation between receive powers of training signals as a function of distance, in accordance with certain aspects of the present disclosure.

For example, FIG. 8 is a graph 800 of a standard deviation between the receive power of two training signals (e.g., signal L1 and L2) as a function of distance. As illustrated, a standard deviation of 8 decibels (dB) between the receive power of L1 and L2 corresponds with a distance of approximately 100 cm between TX station 502 and RX station 504. Based on known deviations between training signals as a function of distance (previously measured), the distance between the first and second apparatus may be determined by the RX station 504. That is, the distance between the first and second apparatuses may be estimated by comparing at least one difference in measured receive powers for one or more pairs of training signals to at least one difference in previously measured receive powers for the one or more pairs of training signals obtained at known distances.

As illustrated, an inverse relationship may exist between the distance (d) and the deviation of the receive power of signal L1 versus the receive power of signal L2. In certain aspects, estimating the distance between the first and second apparatus may be based on a known beam-width of the training signals.

According to certain aspects, a lookup table may be generated based on the relationship between the standard deviations presented with respect to FIG. 8 and the distance between the first and second apparatuses. Therefore an RX station may determine the standard deviation between two received training signals and retrieve a corresponding value for an estimate of the distance d from the lookup table.

Regardless of the technique used to estimate distance d, the RX station may use the value (e.g., to optimize communications, decide whether to associate with the TX station etc.) and, in some cases, may transmit the estimated distance value (e.g., in a frame) back to the TX station for its use.

According to certain aspects of the present disclosure, rather than RX station estimating distance d, the RX station may make measurements of received training signals and transmit parameters back to the TX station (or any other device) to use in estimating the distance d. The other device may estimate a distance between the TX station and RX station in a similar manner as presented above.

For example, for the technique described above where distance is estimated based on deviation between receive power of different training signals, the TX station may obtain a similar lookup table to that described above. The RX station may feedback information regarding the receive power of different training signals (or the difference itself), allowing the TX station to lookup an estimate of distance d from the lookup table. Parameters measured by the RX station or the standard deviation between the two received training signals may be sent to the TX station, and the TX station may use the lookup table to determine the distance between the first and second apparatuses.

Figure 9:
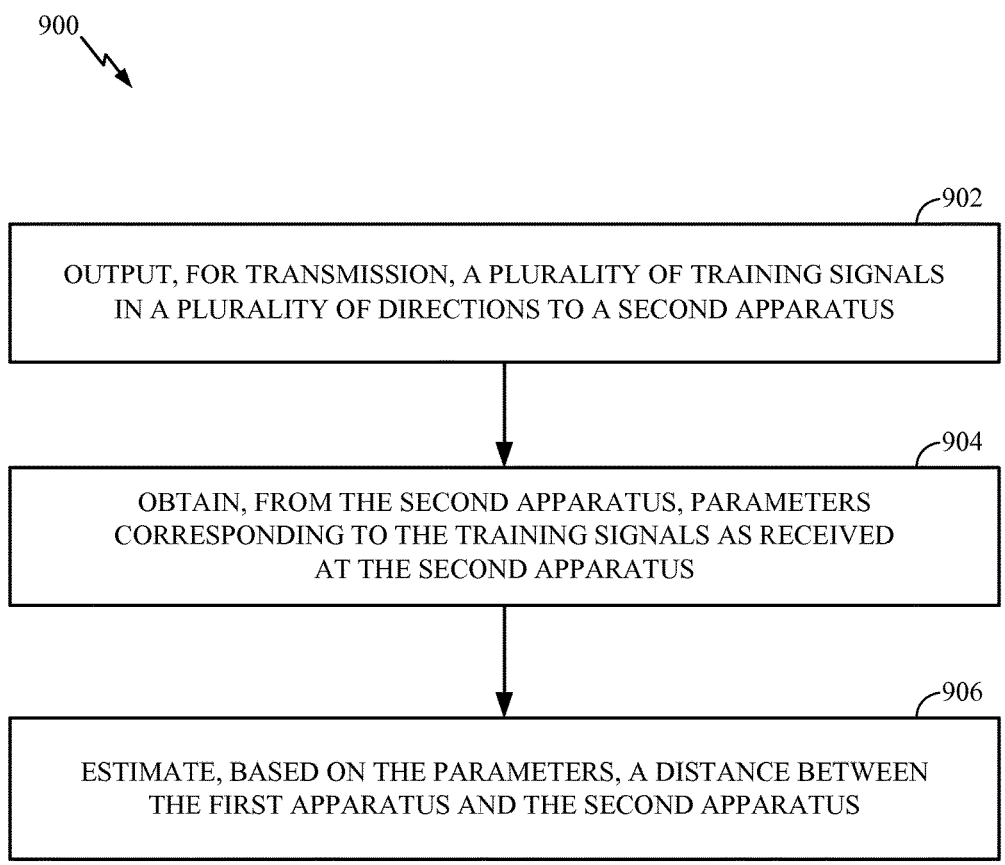
FIG. 9 illustrates example operations that may be performed by a wireless device for determining a distance to another device, in accordance with certain aspects of the present disclosure.

FIG. 9 illustrates example operations 900 for estimating a distance between a first apparatus (e.g., TX station 502) and second apparatus (e.g., RX station 504), in accordance with aspects of the present disclosure. The operations 600 may be performed, for example, by a first apparatus such as the TX station 502.

The operations 900 begin, at 902, by outputting, for transmission, a plurality of training signals in a plurality of directions to a second apparatus. At 904, the TX station 502 may obtain, from the second apparatus, parameters corresponding to the training signals as received at the second apparatus. At 906, the TX station 502 may estimate, based on the parameters, a distance between the first apparatus and the second apparatus.

Figure 6A:
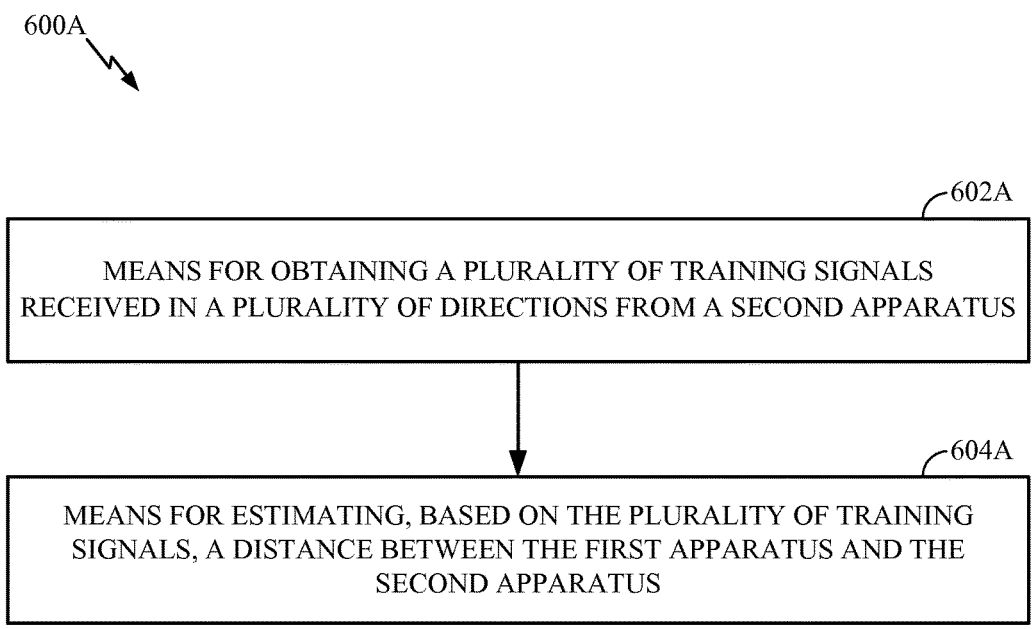
FIG. 6A illustrates example components capable of performing the operations shown in FIG. 6.
Figure 9A:
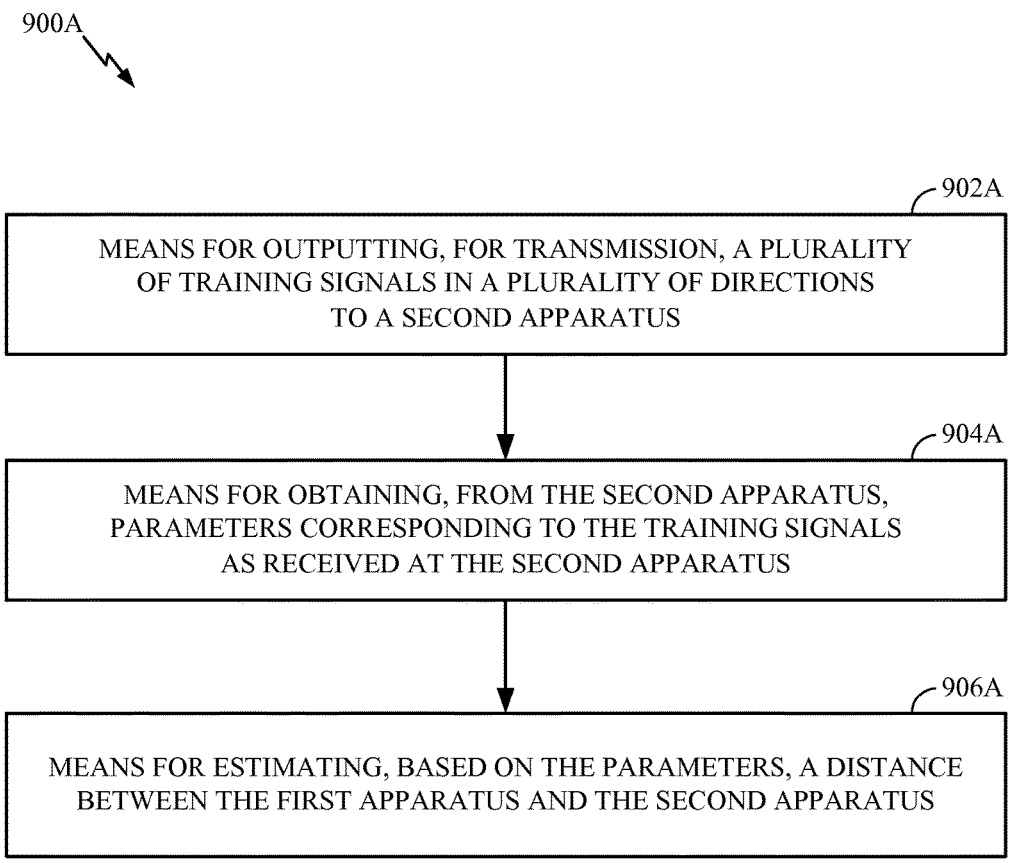
FIG. 9A illustrates example components capable of performing the operations shown in FIG. 9.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600 illustrated in FIG. 6 and operations 900 illustrated in FIG. 9 correspond to means 600A illustrated in FIG. 6A and means 900A illustrated in FIG. 9A, respectively.

For example, means for receiving may comprise a receiver (e.g., the receiver unit 222, 254) and/or an antenna(s) 224, 254 illustrated in FIG. 2 or the receiver 312 and/or antenna(s) 316 depicted in FIG. 3. Means for transmitting may comprise a transmitter (e.g., the transmitter unit 222) and/or an antenna(s) 224 of the access point 110 illustrated in FIG. 2 or the receiver 312 and/or antenna(s) 316 depicted in FIG. 3. Means for processing, means for determining, means for estimating, means for obtaining, means for outputting or means for calculating comprise a processing system, which may include one or more processors, such as the RX data processor 242, 270 the TX data processor 210, 288 and/or the controller 230, 280 illustrated in FIG. 2 or the processor 304 and/or the DSP 320 portrayed in FIG. 3.

In some cases, rather than actually transmitting a frame a device may have an interface to output a frame for transmission. For example, a processor may output a frame, via a bus interface, to a radio frequency (RF) front end for transmission. Similarly, rather than actually receiving a frame, a device may have an interface to obtain a frame received from another device. For example, a processor may obtain (or receive) a frame, via a bus interface, from an RF front end for reception.

According to certain aspects, such means may be implemented by processing systems configured to perform the corresponding functions by implementing various algorithms (e.g., in hardware or by executing software instructions) described above for determining rotation.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A first apparatus for wireless communication, comprising:
    an interface for obtaining a plurality of training signals received in a plurality of directions from a second apparatus; and
    a processing system configured to estimate a distance between the first apparatus and the second apparatus, wherein the estimation comprises estimating the distance based on receive powers of first and second training signals of the plurality of training signals.

2. The first apparatus of claim 1, wherein the estimation comprises estimating the distance based on a ratio of the receive powers of the first and second training signals of the plurality of training signals.

3. The first apparatus of claim 2, wherein:
    the first training signal is received from a first direction and has a highest receive power of the training signals; and
    the second training signal is received from a second direction offset from the first direction at a known angle.

4. The first apparatus of claim 2, wherein the processing system is further configured to estimate the distance based on a known or estimated distance from the second apparatus to an obstruction in a signal path of the second training signal.

5. The first apparatus of claim 1, wherein the processing system is further configured to estimate the distance based on a known beam-width of the training signals.

6. The first apparatus of claim 1, wherein the processing system is configured to estimate the distance based on a difference in the receive powers of the first and second training signals.

7. The first apparatus of claim 6, wherein the processing system is configured to estimate the distance by comparing the difference in the receive powers of the first and second training signals to a difference in previously measured receive powers of third and fourth training signals obtained at known distances.

8. The first apparatus of claim 1, further comprising at least one antenna via which the plurality training signals are received, wherein the first apparatus is configured as a wireless station.

9. A first apparatus for wireless communication, comprising:
    a first interface for outputting, for transmission, a plurality of training signals in a plurality of directions to a second apparatus;
    a second interface for obtaining, from the second apparatus, parameters corresponding to the training signals as received at the second apparatus; and
    a processing system configured to estimate, based on the parameters, a distance between the first apparatus and the second apparatus, wherein the parameters comprise receive powers of first and second training signals of the plurality of training signals.

10. The first apparatus of claim 9, wherein:
    the estimation comprises estimating the distance based on a ratio of the receive powers of the first and second training signals.

11. The first apparatus of claim 10, wherein:
the first training signal is transmitted in a first direction and has a highest receive power of the training signals; and
the second training signal is transmitted in a second direction offset from the first direction at a known angle.

12. The first apparatus of claim 10, wherein the processing system is configured to estimate the distance based on a known or estimated distance from the first apparatus to an obstruction in a signal path of the second training signal.

13. The first apparatus of claim 9, wherein the processing system is further configured to estimate the distance based on a known beam-width of the training signals.

14. The first apparatus of claim 9, wherein:
the processing system is configured to estimate the distance based on a difference in the receive powers of the first and second training signals.

15. The first apparatus of claim 14, wherein the processing system is configured to estimate the distance by comparing the difference in the receive powers of first and second training signals to a difference in previously measured receive powers of third and fourth training signals obtained at known distances.

16. The first apparatus of claim 9, wherein outputting, for transmission, the plurality of training signals comprises outputting the plurality of training signals for transmission using different antenna configurations.

17. The first apparatus of claim 9, further comprising at least one antenna via which the plurality of training signals are transmitted, wherein the first apparatus is configured as a wireless station.

18. A method for wireless communication by a first apparatus, comprising:
obtaining a plurality of training signals received in a plurality of directions from a second apparatus; and
estimating, based on the plurality of training signals, a distance between the first apparatus and the second apparatus, wherein the estimation comprises estimating the distance based on receive powers of first and second training signals of the plurality of training signals.

19. The method of claim 18, wherein the estimating comprises estimating the distance based on a ratio of the receive powers of the first and second training signals of the plurality of training signals.

20. The method of claim 19, wherein:
the first training signal is received from a first direction and has a highest receive power of the training signals; and
the second training signal is received from a second direction offset from the first direction at a known angle.

21. The method of claim 19, wherein the estimating comprises estimating the distance based on a known or estimated distance from the second apparatus to an obstruction in a signal path of the second training signal.

22. The method of claim 18, wherein the estimating comprises estimating the distance based on a known beam-width of the training signals.

23. The method of claim 18, wherein the estimating comprises estimating the distance based on a difference in receive powers of the first and second training signals.

24. The method of claim 23, wherein the estimating comprises estimating the distance by comparing the difference in the receive powers of the first and second training signals to a difference in previously measured receive powers of third and fourth training signals obtained at known distances.

25. A method for wireless communication by a first apparatus, comprising:
outputting, for transmission, a plurality of training signals in a plurality of directions to a second apparatus;
obtaining, from the second apparatus, parameters corresponding to the training signals as received at the second apparatus; and
estimating, based on the parameters, a distance between the first apparatus and the second apparatus, wherein the parameters comprise receive powers of first and second training signals of the plurality of training signals.

26. The method of claim 25, wherein:
the estimation comprises estimating the distance based on a ratio of the receive powers of the first and second training signals.

27. The method of claim 26, wherein:
the first training signal is transmitted in a first direction and has a highest receive power of the training signals; and
the second training signal is transmitted in a second direction offset from the first direction at a known angle.

28. The method of claim 26, wherein the estimating comprises estimating the distance based on a known or estimated distance from the first apparatus to an obstruction in a signal path of the second training signal.

29. The method of claim 25, wherein the estimating comprises estimating the distance based on a known beam-width of the training signals.

30. The method of claim 25, wherein:
the estimating comprises estimating the distance based on a difference in the receive powers of the first and second training signals.

31. The method of claim 30, wherein the estimating comprises estimating the distance by comparing the difference in the receive powers of first and second training signals to a difference in previously measured receive powers of third and fourth training signals obtained at known distances.

32. The method of claim 25, wherein outputting, for transmission, the plurality of training signals comprises outputting the plurality of training signals for transmission using different antenna configurations.

* * * * *